Aug. 28, 1928.
G. A. HILLSTROM
1,681,936
BOAT CARRIER FOR AUTOMOBILES
Filed Sept. 30, 1927
3 Sheets-Sheet 1
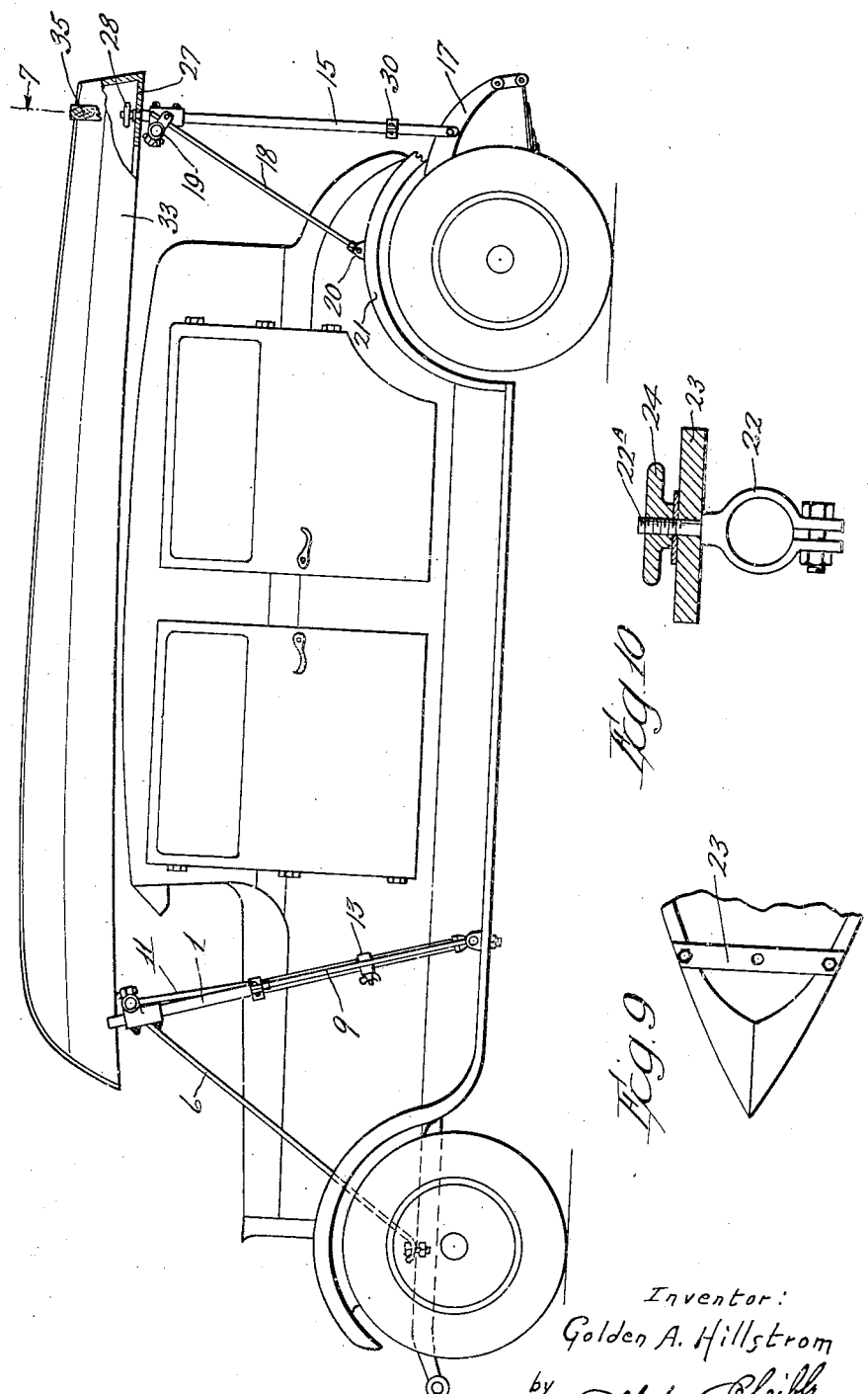
Inventor:
Golden A. Hillstrom
by Albert Scheible
Attorney Aug. 28, 1928.
G. A. HILLSTROM
1,681,936
BOAT CARRIER FOR AUTOMOBILES
Filed Sept. 30, 1927
3 Sheets-Sheet 2
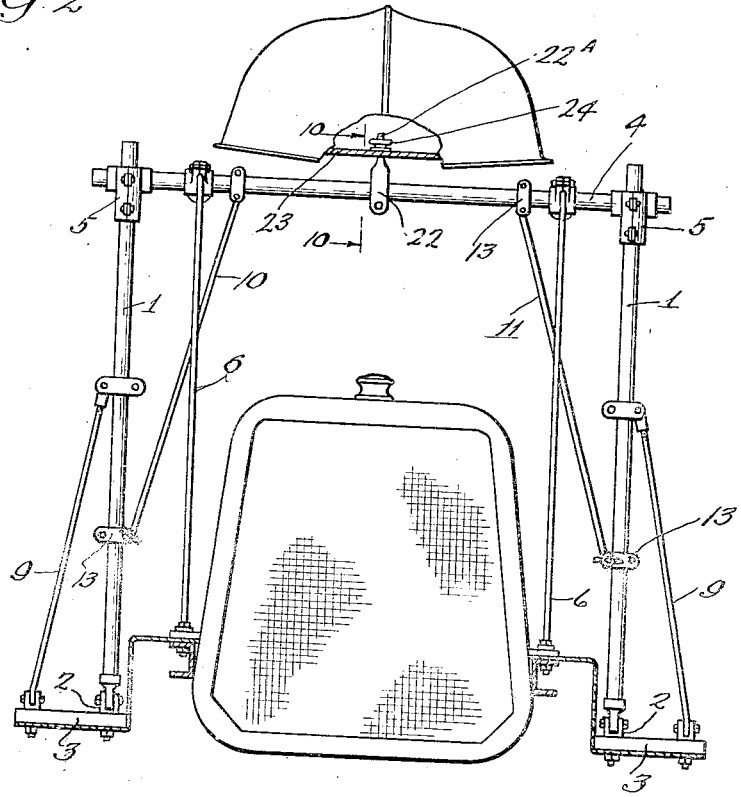
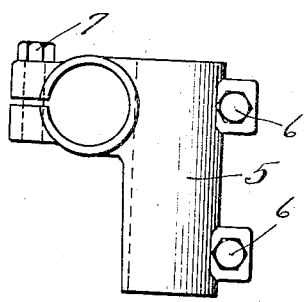
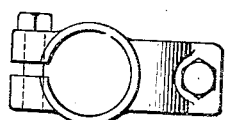
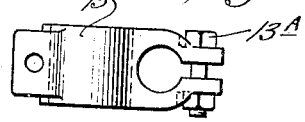
Inventor:
Golden A. Hillstrom
by Albert Scheibli
Attorney Aug. 28, 1928.

G. A. HILLSTROM 1,681,936

BOAT CARRIER FOR AUTOMOBILES

Filed Sept. 30, 1927

Inventor:
Golden A. Hillstrom
by Albert Scheible
Attorney

Patented Aug. 28, 1928.

1,681,936

UNITED STATES PATENT OFFICE.

GOLDEN A. HILLSTROM, OF CHICAGO, ILLINOIS.

BOAT CARRIER FOR AUTOMOBILES.

Application filed September 30, 1927. Serial No. 222,988.

My invention relates to means for supporting a rowboat or the like on an automobile, and in some of its general objects provides a supporting arrangement which will satisfy these requirements:

(1) That it can readily be attached to standard types of automobiles, or detached from the same.

(2) That it can readily be adjusted in height and width to the automobile to which it is attached, and to the width of the boat.

(3) That it will firmly support the boat without scratching or otherwise marring either the boat or the top of the automobile.

(4) That it will be suitably braced to prevent winds or vibration from materially swaying the boat.

(5) That it will not interfere with access to the doors or mechanism of the automobile.

(6) That it will require only a small amount of time either for securing the boat in its firmly supported position or for taking the boat down.

When the user of a rowboat, canoe, or the like wishes to transport such a vessel on his automobile, it has heretofore been customary to fasten the boat upon the top of the vehicle body by means of ropes or straps, with the boat inverted. Since the ordinary automobile has no parts conveniently disposed for securing the needed ropes or straps to them, it is difficult to fasten a boat in this manner. Moreover, even with the ropes or straps drawn fairly taut, these have not prevented the boat from being bounced up and down on the top of the automobile body when the vehicle was jolted by the roughness of the road, thus damaging both the boat and the top of the automobile body. It has also been found impossible even in dry weather to prevent the boat from sliding both longitudinally and laterally when the car travels over rough roads, or when the car skids; and, owing to the accumulation of sand and the like on the top of the automobile body, such sliding usually caused a serious scratching of both this body and the boat.

In changeable weather, these difficulties have been increased, as ropes or straps after being drawn taut in wet weather will expand as they dry out, thereby loosening the fastenings. On the other hand, such ropes or straps if tightened while dry will shrink in length when moistened by rain, thus pressing on the boat with such force as to damage a canvas-covered boat or a light canoe.

My invention aims to overcome these objections and also aims to meet the above enumerated requirements, together with other objects which will appear from the following specification and from the accompanying drawings.

In these drawings,

Fig. 1 is a side elevation of an automobile equipped with a boat supporting attachment embodying my invention and supporting a rowboat, a rear portion of the boat being cut away.

Fig. 2 is a front elevation of the forward member of the boat-support of Fig. 1, showing the automobile parts to which this member is secured and showing the supported boat with a portion of its prow cut away.

Fig. 4 is an enlarged side elevation of one of the fittings which connect the risers of the forward member to the cross-bar of the latter.

Figs. 5 and 6 are respectively enlarged plan and front views of one of the fittings which hingedly connect the upper braces of the forward member with the cross-bar of the latter.

Fig. 9 is a framentary plan view of the prow of the boat.

Fig. 10 is an enlarged vertical section taken along the line 10—10 of Fig. 2.

Figure 3:
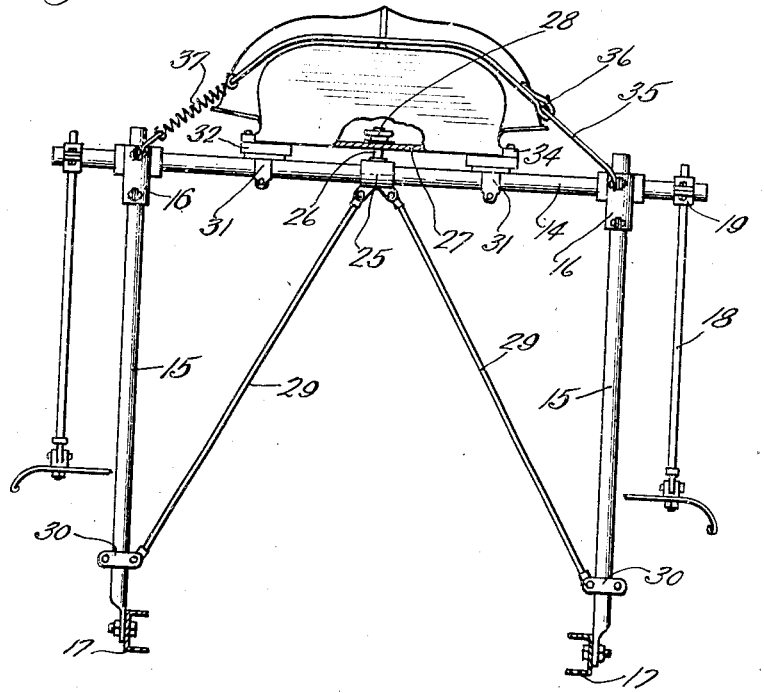
Fig. 3 is a rear elevation of the rear member of the boat-support of Fig. 1, showing the automobile parts to which this rear member is secured and showing the supported boat with a portion of its stern cut away.

In the illustrated embodiment, my automobile attachment includes two members secured to the automobile respectively forward of the automobile body and behind the latter, each member having as its main portion an inverted U-shaped structure in which the shanks of the U form risers, and in which the back of the U forms a cross-bar disposed higher than the top of the automobile body. It also includes suitably disposed braces for preventing each of these main members from swaying, and conveniently arranged means for securing an inverted boat to the two cross-bars. While the details of such an arrangement may obviously be varied in many ways, these are here shown as follows:

For the risers of the forward member, I provide two pipes 1, each swiveled at their lower ends to swivel ears 2 which are respectively bolted to the running boards 3 disposed at opposite sides of the automobile, and forward of the front doors, all as shown in Figs. 1 and 2. Upper portions of the risers 1 are connected by a cross-bar 4, which may also be a pipe, and the connections being desirably by partly split elbows 5 constructed so that a loosening of the side bolts 6 will permit the cross-bar to be raised or lowered according to the height of the car body, while a loosening of the top bolt 7 will permit the spacing of the risers 1 to be varied according to the spacing between the swivel ears 2 on the two running boards. A suitable fitting for this purpose is shown on a larger scale in Fig. 4.

Figure 12:
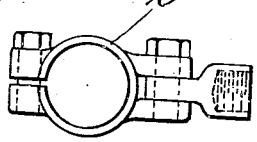
Fig. 12 is an enlarged plan view of one of the fittings which connect the risers of the forward members with the lateral braces for these risers.
Figure 11:
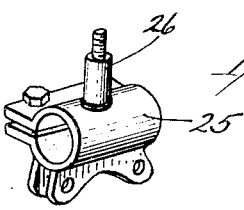
Fig. 11 is an enlarged perspective view of the fitting mounted on the middle of the cross-bar of the rear member.

To prevent these forward risers from swaying longitudinally of the automobile, I provide forward braces 8 connected at their lower ends to chassis portions considerably forward of the swivel ears 2 and connected at their upper ends to elevated portions of the risers by swiveling clamps 12, one of the latter clamps being shown separately in Fig. 12. I also desirably interpose an inclined brace 9 between each of the risers and a portion of the running board laterally outward of the foot of the riser, as shown in Fig. 2.

To stiffen the inverted U-shaped main portion of the forward member, I also desirably provide inclined braces 11 connecting laterally spaced parts of the cross-bar 4 with portions of the risers 1 between the lower ends of the latter and the swivel ears 9, and I preferably make these connections by means of swiveling clamps 13, each of which will respectively permit the upper end of one inclined brace to be shifted along the cross-bar 4 and the lower end to be adjusted vertically on the riser 1. The swiveling fittings used for this purpose can be as shown in Figs. 5 and 6, and by removing the swiveling bolt 13$^A$ through which the lower end of either inclined brace is connected to the corresponding fitting 13, I can swing this brace about its swiveling connection to the cross-bar 4, so as to obtain more ready access to the engine hood past which the inclined brace may extend.

For the rear member of my support, I also provide an inverted U-shaped main portion comprising an elevated cross-bar 14 adjustably connected to risers 15 by fittings 16 (which may also be of the elbow type of Fig. 4) and fasten the lower ends of the risers 15 to laterally spaced chassis parts, such as the frame members 17. Then I provide forwardly inclined braces 18 each connected at its upper end to the cross-bar 14 by a clamping fitting 19 and connected at its lower end by a swiveling fitting 20 to an automobile portion forward of the lower ends of the risers 15, such as a fender 21.

With the two main members thus mounted and adjusted so that the two cross-bars are higher than the automobile body, I can readily employ these cross-bars for supporting an inverted boat entirely clear of the body of the car. To anchor the inverted boat to these cross-bars, I preferably provide a substantially single-point forward support in the form of a clamp 22 (Fig. 10) secured to the middle of the forward cross-bar 4 and having an upwardly directed threaded stem 22$^A$ which extends through a perforation in a forward part of the boat (such as the strip 23 of Figs. 2 and 10), the clamp having a shoulder below this threaded stem, against which shoulder the said boat part can be clamped by a nut 24.

On the rear cross-bar 14 I mount a companion clamp 25 having an upwardly directed stud 26 which has its threaded tip disposed for extending through a rearward boat portion, such as the stern board 27 of Figs. 1 and 3, and clamped to this board by a nut 28. The clamp 25 desirably is swiveled also to two inclined braces 29, each of which braces is secured by a clamp 30 to one of the rear risers 15 near the lower end of the latter, thereby bracing the rear member laterally.

Figure 7:
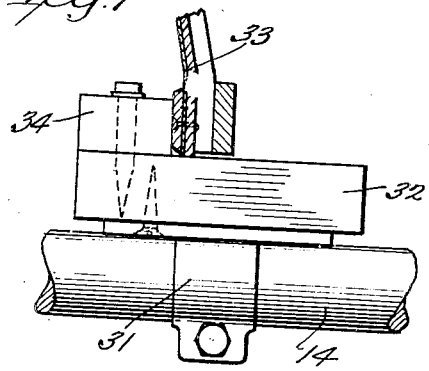
Fig. 7 is an enlarged and fragmentary vertical section taken along the line 7—7 of Fig. 1, showing part of the means employed for preventing the rear portion of the boat from sliding laterally.
Figure 8:
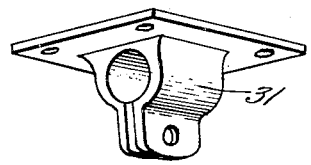
Fig. 8 is an enlarged perspective view of one of the fittings connected to the cross-bar of the rear member in Fig. 7.

With boats of stiff construction, the two-point support as thus provided may be ample. However, for canoes or for rowboats of light canvas covered construction, I preferably employ a three-point support by providing the rear cross-bar 14 with means for supporting two laterally opposite edge portions of the canoe or other boat. For this purpose, I am showing two clamps 31, each of the type of Fig. 8, and each having a flat top supporting a block 32 which underhangs an edge strip 33 of the boat, together with a ledge strip 34 engaging the outer side face of the boat. By adjusting the spacing of the clamps 31, I can cause these ledge strips 34 to bear laterally against the boat, as shown in Fig. 7, thereby preventing the boat from shifting transversely of the automobile.

For light boats, I also preferably do not depend merely on the rear central clamp to hold the boat down on the blocks 32, but provide a flexible member—such as a strap 35— passing over the boat and secured at its ends to the rear supporting member, this being here shown as latched by a buckle 36 and as having its ends connected to the two elbow fittings 16. Since such a strap will change in length with its dampness or dryness, I also provide means for tensioning the strap to compensate for its stretching, such as a spiral spring 37 interposed between one end of the strap and the adjacent clamp 16. By introducing such spring means, I permit the strap to be kept taut regardless of weather conditions and without tensioning the strap to such a degree as to injure the boat. With many types of boats, the spring tensioned strap and the stud bolt 26 may suffice, while with frail boats the lateral guides 34 are desirably used (either with or without the said stud bolt on the clamp 25), hence I do not wish to be limited in these respects. Nor do I wish to be limited to the particular fittings, points of connection to the vehicle, or other details of the construction and arrangement above described, since many changes might obviously be made without departing either from the spirit of my invention or from the appended claims.

It will also be obvious that the means for connecting the two riser tops (here shown as cross-bars) with the boat can be interchanged, so that a boat could be carried equally well with its prow directed rearwardly of the automobile. Hence my referring to the boat as supported with its prow above a forward portion of the automobile is merely illustrative and I do not wish to be limited in this respect.

I claim as my invention:

1. Means for supporting a boat on an automobile, comprising a pair of inverted U-shaped risers respectively secured to forward and rear portions of the automobile and both extending above the automobile, means for securing the top of one riser to a single point on the boat, the other riser having its bight disposed for supporting two opposite edge portions of the boat, and means associated with the last named riser for clamping the boat to the latter.

2. Means for supporting a boat on an automobile, comprising a pair of inverted U-shaped risers respectively secured to forward and rear portions of the automobile and both extending above the automobile, means for securing the top of one riser to a single point on the boat, the other riser having its bight disposed for supporting two opposite edge portions of the boat, and means associated with the last named riser for clamping the boat downwardly upon the said bight and for preventing the boat from sliding upon the said bight transversely of the automobile.

3. A boat-supporting attachment for an automobile, as per claim 1, in which each riser comprises two substantially upright members and a cross-bar adjustably connected to these members, in combination with inclined braces each connecting the cross-bar with a part of one upright member considerably below the cross-bar.

4. Boat supporting means as per claim 1, including a pair of braces for stiffening the forward riser member transversely of the automobile, the said braces extending respectively at opposite sides of the engine of the automobile, one of the braces being pivotally connected to the forward riser member at one end and detachably connected at its other end to permit this brace to be swung out of the way for access to the engine.

5. Means for supporting a boat on an automobile, comprising a pair of inverted U-shaped risers respectively secured to forward and rear portions of the automobile and both extending above the automobile, means for securing the top of one riser to a single point on the boat, the other riser having its bight disposed for supporting two opposite edge portions of the boat, and a clamp carried by the last named riser for securing the boat to the latter, the clamp including a threaded stem extending through a portion of the boat.

6. Boat-supporting means as per claim 1, including braces connecting each riser with parts of the automobile spaced longitudinally of the riser from the foot of the latter, for bracing the riser against movement longitudinally of the automobile.

7. Means for supporting a boat in inverted position on an automobile, comprising a riser mounted on the automobile beyond one end of the body of the automobile, a clamping means on the said riser including a threaded stem passing through a portion of the boat and having a shoulder below its thread, means threaded on the said stem for clamping the said boat portion against the shoulder; a second riser mounted on the automobile near the other end of the automobile body, the second riser having two elevated portions of equal height spaced transversely of the automobile and respectively underhanging the edges of two opposite sides of the boat; and means for clamping the boat to the second riser.

8. Means for supporting an inverted boat on an automobile, comprising a pair of inverted U-shaped risers mounted at their feet upon the automobile respectively forward of, and behind the body of the automobile; means for clamping the top of one riser to a transversely central part of the boat, a pair of adjustably mounted stops on the top of the second riser for respectively engaging opposite lateral edges of the boat, and means for clamping the boat to the last named riser.

9. An automobile attachment for the supporting of an inverted boat having a transversely central perforation in its gunwale, comprising two riser members spaced by a distance less than the length of the boat and both mounted on the chassis of the automobile, a bolt associated with the top of one riser and extending through the said perforation to clamp the gunwale to that riser, two stops on the other riser for preventing lateral movement of the boat on the other riser in both directions, and means on the last named riser for securing the boat thereto.

10. Means for supporting an inverted boat on an automobile, comprising an inverted U-shaped riser having its feet respectively secured to forward portions of the running boards of the automobile; means on the middle of the top of the riser for securing a forward portion of the boat to the riser; a second inverted U-shaped riser having its feet respectively secured to rear portions of the chassis of the automobile, and means for securing a rear part of the boat to the top of the second riser, the last named means including a pair of laterally spaced clamping members secured to the said second riser, each clamping member having a portion underhanging an edge of the boat and another portion engaging one side of the boat.

11. Boat-supporting means as per claim 1, including a pair of braces respectively connecting the top of the forward riser with chassis portions disposed forwardly of the riser at opposite sides of the automobile.

Signed at Chicago, Illinois, September 26th, 1927.

GOLDEN A. HILLSTROM.